United States Patent [19]

Kufta et al.

[11] Patent Number: 4,688,252
[45] Date of Patent: Aug. 18, 1987

[54] IV SAP/STEREO AUDIO SYSTEM

[75] Inventors: George Kufta, Glenview; David S. Tait, Addison, both of Ill.

[73] Assignee: Zenith Electronics Corporation, Glenview, Ill.

[21] Appl. No.: 811,035

[22] Filed: Dec. 19, 1985

[51] Int. Cl.[4] ............................................... H04H 5/00
[52] U.S. Cl. ......................................... 381/4; 358/144
[58] Field of Search ............................ 381/3, 11, 4, 2; 358/144, 198

[56] References Cited

U.S. PATENT DOCUMENTS 4,389,536 6/1983 Schickedanz ..................... 358/198
4,461,021 7/1984 Schwarz et al. ..................... 358/198

*Primary Examiner*—Forester W. Isen

[57] ABSTRACT

A TV SAP/stereo audio system includes a DC switch for selectively coupling the output of a stereo decoder and the output of a SAP detector to a stereo amplifier. A DC voltage, representative of the SAP carrier level, is developed and applied to a pair of threshold transistors. The lower threshold transistor is driven conductive when the DC voltage is below a first voltage and the upper threshold transistor is driven conductive when the DC voltage is above a second voltage. The threshold voltages are established by a pair of voltage dividers. A SAP control transistor is coupled to the collectors of the threshold transistors and is driven conductive when either threshold transistor is in conduction. The SAP control transistor is connected to the DC switch and prevents coupling of the SAP detector output to the stereo amplifier when it is conducting. A stereo cutoff transistor is coupled to the SAP control transistor for enabling the DC switch to couple the output of the stereo decoder to the stereo amplifier when a SAP mode is selected by a selector switch and the SAP control transistor is conducting.

6 Claims, 1 Drawing Figure

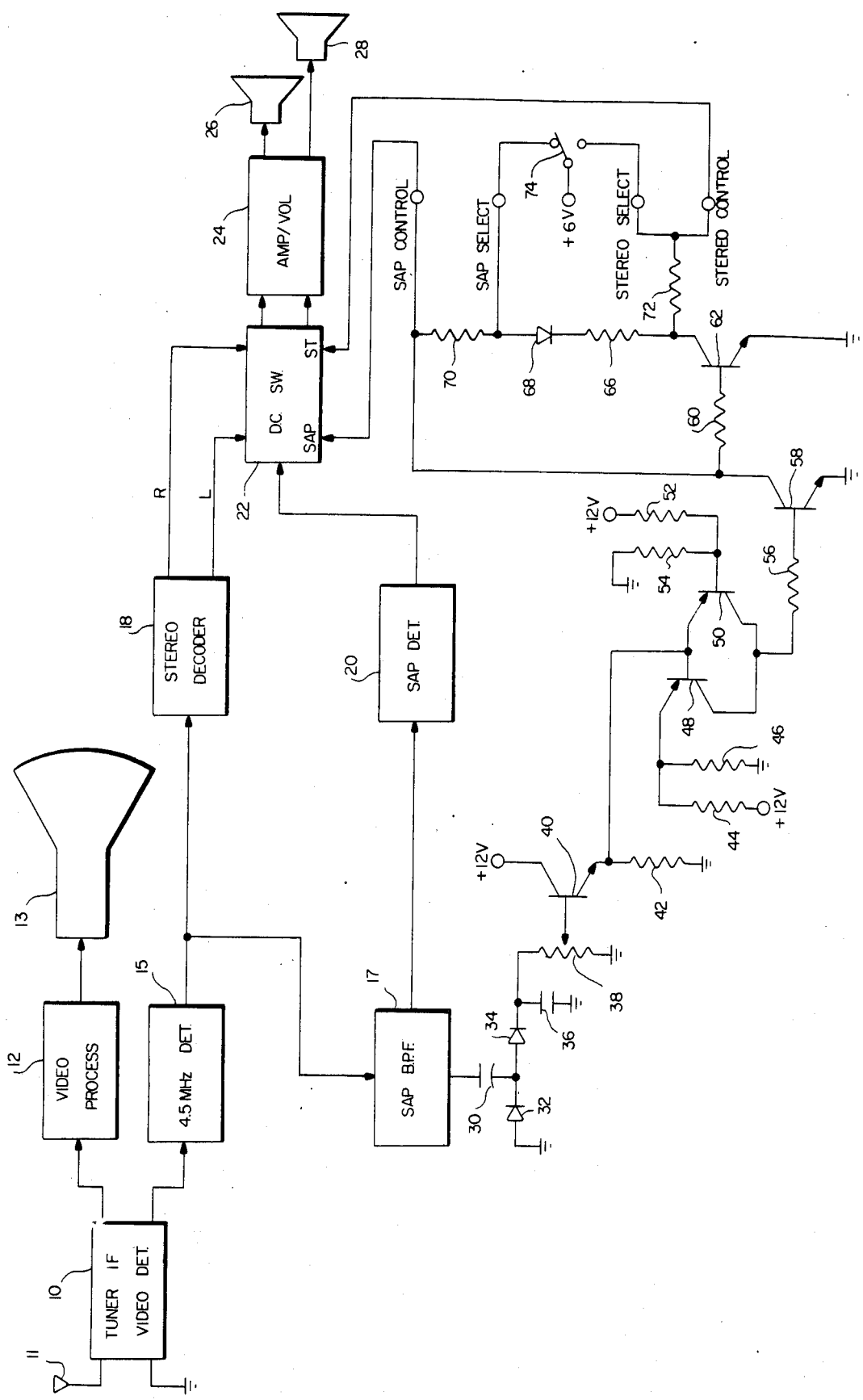

IV SAP/STEREO AUDIO SYSTEM

BACKGROUND OF THE INVENTION

This invention relates generally to systems for decoding television signals having a second audio program (SAP) and stereo audio signals.

Recently the Federal Communications Commission authorized broadcast transmission of television (TV) signals bearing coded stereo audio information, SAP information, and other information, generally useful to broadcast/cable operators. A TV must be specially designed to receive and detect these audio signals. Alternatively, a separate decoder may be used in conjunction with a conventional TV since all of the added information is included with the conventional audio carrier. The TV decoder, or separate decoder must determine which of the signals are present and reproduce the audio signal that the viewer selects. The SAP information, which may comprise a foreign language accompaniment, is a preferred mode of receiver operation for many viewers and is therefore the source of choice when it is available.

Prior art decoder systems include a microprocessor-based selection switch that is viewer operated for choosing between the SAP and stereo audio formats. A detection circuit that is responsive to the SAP carrier (equal to five times the TV horizontal line frequency) generates a DC signal indicative of the SAP carrier level. When SAP information is not being telecast, as evidenced by lack of a SAP carrier, the microprocessor causes the decoder to shift to the stereo audio mode. The prior art SAP decoder is expensive and prone to erroneous operation, especially when no SAP information is present or when the SAP carrier is weak. Consequently, there is a need in the art for more reliably determining the presence of SAP information for controlling the automatic switching from SAP to stereo.

OBJECTS OF THE INVENTION

A principal object of the invention is to provide an improved SAP/stereo audio system.

A further object of the invention is to provide a novel SAP to stereo audio switchover circuit.

Another object of the invention is to provide a novel circuit for reliably determining when SAP information is present.

BRIEF DESCRIPTION OF THE DRAWING

These and other objects of the invention will be apparent upon reading the following description in conjunction with the drawing, the single FIGURE of which is a combined block and schematic diagram of a SAP/stereo audio system constructed in accordance with the invention.

DESCRIPTION OF THE PREFERRED EMBODIMENT

Referring to the drawing, a tuner, IF and video detector (tuner/detector) circuit 10 receives broadcast television signals via an antenna 11 and includes an output for supplying detected video to a video processor 12 for driving a conventional cathode ray tube 13. It will be appreciated that antenna 11 is shown for illustrative purposes only and that the signal input to the tuner may also be from a cable. Another output of tuner/detector 10 supplies a 4.5 MHz detector 15 which has one output coupled to, through a 4.5 MHz amplifier 16, to a SAP bandpass filter 17 and another output coupled to a stereo decoder 18. Stereo decoder 18 also conventionally includes circuitry for automatically producing a monaural signal on both the left (L) and right (R) channel outputs in the event a stereo audio signal is not present. The output of stereo decoder 18 in the presence of a TV stereo telecast, consists of an L signal and an R signal which are supplied to a DC switch 22. DC switch 22, in turn, supplies L and R signals to a stereo amplifier and volume (stereo amplifier) circuit 24, the two outputs of which drive left and right stereo speakers 26 and 28. An output from SAP band-pass filter 17 is coupled to a SAP detector 20 for detecting the SAP information and supplying it to DC switch 22. The SAP bandpass filter 17 is tuned to select the SAP carrier which, as mentioned, has a frequency that is five times the horizontal line frequency in the television signal. DC switch 22, as will be described, is controlled at a SAP control input and a stereo control input, for enabling passage of either the information from SAP detector 20, or the information from stereo decoder 18, to amplifier 24. In the event a stereo audio signal is not present, decoder 18 supplies a monaural signal to each output, making the L and R signals the same.

In accordance with the invention, a DC voltage that represents the SAP carrier level is applied to a window established by a lower threshold transistor and an upper threshold transistor. The DC voltage must fall within the window to enable DC switch 22 to couple the output of SAP detector 20 to amplifier 24. The window effectively rejects SAP information when the DC voltage level is below the lower threshold or is above the upper threshold. The lower threshold represents a no SAP carrier condition, in which event the circuit automatically switches to the stereo audio mode. The upper threshold represents either a no TV channel condition or a very weak SAP condition. For a no channel condition, the audible noise produced when the decoder is in the SAP mode is much higher than that produced when in the stereo mode and therefore more disturbing to a viewer. With a SAP signal that is too weak to be acceptable, the broadcast stereo or monaural signals may still be acceptable for listening purposes. This is due to system limitations in the makeup of the SAP signal. Thus, while the SAP mode is preferred, the system switches to the stereo audio mode when there is no SAP signal or when there is a weak SAP signal.

Another output signal from SAP bandpass filter 17 is rectified and filtered by means of a capacitor 30, a pair of diodes 32 and 34 and a capacitor 36. The resultant DC potential is impressed upon a potentiometer 38 which supplies the base of an emitter follower transistor 40. Transistor 40 has its collector connected to +12 volts and its emitter connected through a resistor 42 to ground potential.

The window is formed by a lower threshold transistor 48 and an upper threshold transistor 50, both of the PNP type, with the base of transistor 48 being connected to the emitter of transistor 50 and the collectors of the two transistors being connected together. The emitter of transistor 48 is connected to the junction of a first voltage divider formed by a pair of resistors 44 and 46 connected between +12 volts and ground. Similarly, the base of upper threshold transistor 50 is connected to the junction of a second voltage divider formed by a pair of resistors 52 and 54 connected between +12 volts and ground. The emitter of transistor 40 is coupled to both the base of transistor 48 and the emitter of transistor 50. The collectors of the threshold transistors are connected through a resistor 56 to the base of a SAP control transistor 58, of the NPN type, which has its emitter connected to ground and its collector connected to a SAP control terminal 76 that, in turn, is connected to a SAP control input on DC switch 22. The collector of SAP control transistor 58 is also connected through a resistor 60 to the base of a NPN transistor 62 that serves as a stereo cutoff. Transistor 62 has its emitter connected to ground and its collector connected through a resistor 72 to a stereo control terminal 82, which is also connected to a stereo control input on DC switch 22. The collector of transistor 62 is also connected through a series arrangement of a resistor 66, a diode 68 and a resistor 70 to SAP control terminal 76. The junction of resistor 70 and diode 68 is supplied to a SAP select terminal 78. A stereo select terminal 80 is connected in parallel with stereo control terminal 82. A user operated selector switch 74 is provided for connecting +6 volts either to SAP select terminal 78 or to stereo select terminal 80.

In operation, the DC voltage developed across potentiometer 38, which is adjustable by movement of the wiper of the potentiometer, is coupled by emitter follower transistor 40 to the window circuit consisting of transistors 48 and 50 and the voltage dividers. If this voltage is 0.7 volts below the potential at the junction of resistors 44 and 46, lower threshold transistor 48 will conduct. On the other hand, if this voltage is 0.7 volts greater than the voltage at the junction of resistors 52 and 54, upper threshold transistor 50 will conduct. When either transistor conducts, its conduction current passes through resistor 56 and drives SAP control transistor 58 into saturation and forces its collector voltage close to ground potential. This places a ground potential on SAP control terminal 76 and the SAP control input of DC switch 22 and prevents DC switch 22 from coupling the output of SAP detector 20 to amplifier 24. Assume that viewer selector switch 74 is in the SAP position and impresses +6 volts on terminal 78. This potential is coupled through resistor 70 to SAP control terminal 76 and energizes the SAP control input of DC switch 22. DC switch 22 will couple the output of SAP detector 20 to amplifier 24 unless SAP control transistor 58, is conductive, in which event terminal 76 will be held at ground potential. Even though selector switch 74 is in the SAP position, DC switch 22 will not pass the output of SAP detector 20 to amplifier 24. Thus, conduction of SAP control transistor 53, responsive to conduction of one of the window threshold transistors 48 or 50, blocks any SAP information from getting to amplifier 24.

The potential on terminal 78 is also applied through diode 68 and resistor 66 to stereo cutoff transistor 62. Since the collector of transistor 58 is near ground potential, the base-emitter junction of transistor 62 is not forward biased and transistor 62 remains in cutoff. The potential at its collector is supplied through resistor 72 to stereo control terminal 82 and to the stereo control input of DC switch 22, which activates DC switch 22 to couple the outputs of stereo decoder 18 to amplifier 24. Thus, when selector switch 74 is in the SAP mode and no SAP signal is present, or when a very weak SAP signal is present, SAP control transistor 58 is conductive and disables stereo cutoff transistor 62. This permits operating potential to be applied to the stereo control input of DC switch 22 and it couples the output of stereo decoder to the stereo amplifier. Thus the stereo decoder input is selected in the absence of a SAP signal. When selector switch 74 is in its stereo mode, that is, with +6 volts applied to stereo select terminal 80 and, via stereo control terminal 82, to the stereo control input of DC switch 22, the DC switch operates to select the output of stereo decoder 18. The presence of SAP information has no effect when selector switch 74 is in the stereo mode, since transistor 58 has no collector potential. Diode 68 is poled to prevent feedback of the positive potential at the collector of stereo cutoff transistor 62 to the SAP input terminal of DC switch 22.

What has been described is a novel SAP/stereo audio system in which the incoming SAP carrier is detected and a DC voltage, representative of its level, is compared with two thresholds for controlling passage of the output of the SAP detector to an amplifier. For SAP carrier levels that result in DC voltages falling outside the window, the system automatically selects a stereo audio input.

It is recognized that numerous modifications and changes in the described embodiment of the invention will be apparent to those skilled in the art without departing from its true spirit and scope. The invention is to be limited only as defined in the claims.

What is claimed is:

1. A television SAP/stereo audio system including a 4.5 MHz detector comprising:
   SAP detection means coupled to said 4.5 MHz detector for recovering SAP information;
   stereo decoder means coupled to said 4.5 MHz detector for recovering stereo audio information;
   stereo amplifier means;
   switching means selectively coupling the outputs of said SAP detection means and said stereo decoder means to said stereo amplifier means; and
   window means, coupled to said 4.5 MHz detector and to said switching means, and responsive to SAP carrier levels for controlling said switching means to couple the output of said SAP detection means to said stereo amplifier means only for a limited range of detected SAP carrier levels defined by said window means.

2. The system of claim 1 wherein said window means comprises a lower threshold means and an upper threshold means.

3. The system of claim 2 further including a SAP/stereo audio selector switch having a SAP mode and a stereo mode, said switching means having a SAP control input and a stereo control input and means for disabling said SAP control input of said switching means when said selector switch is in said stereo mode.

4. The system of claim 3 wherein each of said threshold means comprises a transistor coupled to a voltage divider and wherein each of said transistors is supplied with a DC signal representative of the SAP carrier level from said 4.5 MHz detector.

5. A television receiver including a 4.5 MHz detector for developing modulated stereo audio and SAP information signals;
   a stereo decoder and a SAP bandpass filter coupled to said 4.5 MHz detector;
   a SAP detector coupled to said SAP bandpass filter;
   a stereo amplifier;
   DC switching means, having a SAP control input, a stereo control input, signal inputs coupled to said stereo decoder and to said SAP detector and an output coupled to said stereo amplifier;

window means;

a SAP control transistor coupled between the output of said window means and the SAP control input of said DC switching means;

a selector switch for selectively applying a potential to the stereo control input of said DC switching means in one mode and to said SAP control transistor in another mode for controlling operation of said DC switching means to selectively couple the outputs of said SAP detector and said stereo decoder to said stereo amplifier;

means, coupled to said SAP bandpass filter, for developing a DC voltage representative of the SAP carrier level; and window means including a lower threshold transistor and an upper threshold transistor, both supplied with said DC voltage for determining when said SAP carrier is within prescribed limits and for preventing coupling of the output of said SAP detector means to said stereo amplifier when either of said threshold transistors is conducting.

6. The system of claim 5 further including a stereo cutoff transistor coupled to the output of said SAP control transistor and to said selector switch for forcing said DC switching circuit to couple the output of said stereo decoder to said stereo amplifier when said SAP control transistor is conducting.

* * * * *

UNITED STATES PATENT AND TRADEMARK OFFICE
CERTIFICATE OF CORRECTION

PATENT NO. : 4,688,252

DATED : August 18, 1987

INVENTOR(S) : George Kufta and David S. Tait

It is certified that error appears in the above-identified patent and that said Letters Patent is hereby corrected as shown below:

In the title of the patent change "IV" to
--TV--.

Signed and Sealed this

First Day of November, 1988

Attest:

DONALD J. QUIGG

Attesting Officer

Commissioner of Patents and Trademarks